(12) United States Patent
Ziemer et al.

(10) Patent No.: US 9,470,274 B2
(45) Date of Patent: Oct. 18, 2016

(54) CLAW SHIFTING ELEMENT COMPRISING A SLIDING SLEEVE FOR AN AUTOMATIC TRANSMISSION OF A MOTOR VEHICLE

(71) Applicant: ZF Friedrichshafen AG, Friedrichshafen (DE)

(72) Inventors: Peter Ziemer, Tettnang (DE); Martin Brehmer, Tettnang (DE); Christoph Margraf, Markdorf (DE); Benjamin Schneider, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 12 days.

(21) Appl. No.: 14/484,763

(22) Filed: Sep. 12, 2014

(65) Prior Publication Data
US 2015/0068344 A1 Mar. 12, 2015

(30) Foreign Application Priority Data
Sep. 12, 2013 (DE) .......................... 10 2013 218 241

(51) Int. Cl.
*F16D 11/14* (2006.01)
*F16D 25/061* (2006.01)
*F16D 11/00* (2006.01)

(52) U.S. Cl.
CPC ............ *F16D 11/14* (2013.01); *F16D 25/061* (2013.01); *F16D 2011/006* (2013.01); *Y10T 74/20177* (2015.01)

(58) Field of Classification Search
CPC ............ F16D 11/14; F16D 2011/006; F16D 25/061; Y10T 74/20177
See application file for complete search history.

(56) References Cited

U.S. PATENT DOCUMENTS

| 4,462,489 | A | * | 7/1984 | Morscheck | ......... F16D 23/0606 192/53.332 |
| 5,531,305 | A | * | 7/1996 | Roberts | ................... F16D 23/06 192/53.332 |
| 5,667,330 | A | | 9/1997 | Henkel et al. | |
| 5,711,740 | A | | 1/1998 | Bakowski | |
| 8,460,144 | B2 | | 6/2013 | Ziemer | |
| 8,721,483 | B2 | | 5/2014 | Ziemer et al. | |
| 2004/0154892 | A1 | * | 8/2004 | Coxon | ................... F16D 23/06 192/53.31 |
| 2009/0272212 | A1 | * | 11/2009 | Raszkowski | .......... F16D 25/061 74/331 |
| 2010/0199799 | A1 | * | 8/2010 | Gumpoltsberger | ..... F16D 21/04 74/491 |

FOREIGN PATENT DOCUMENTS

DE  103 51 304 A1  6/2005
GB  2 142 390 A  1/1985

OTHER PUBLICATIONS

German Patent Office Search Report, Jun. 30, 2014.

* cited by examiner

*Primary Examiner* — Jacob S Scott
(74) *Attorney, Agent, or Firm* — Dority & Manning, P.A.

(57) ABSTRACT

A claw shifting element for a motor vehicle transmission includes a sliding sleeve that is axially fixed in its two end positions by frictional locking.

14 Claims, 2 Drawing Sheets

CLAW SHIFTING ELEMENT COMPRISING A SLIDING SLEEVE FOR AN AUTOMATIC TRANSMISSION OF A MOTOR VEHICLE

FIELD OF THE INVENTION

The present invention relates to a claw shifting element comprising an axially fixed sliding sleeve for an automatic transmission of a motor vehicle.

BACKGROUND

In the development of automatic transmissions, it is expected that claw shifting elements will be increasingly used, primarily because, compared to conventional frictional shifting elements, they are clearly more favorable in terms of the drag torques, such that the overall efficiency of the transmission can be increased.

It is known from the state of the art to keep closed both the friction-locking shifting elements, such as multi-disk shifting elements, and the positive-locking shifting elements or the claw shifting elements of an automatic transmission through hydraulically actuated pistons with a corresponding pressure.

Thereby, the pressure oil guidance for the pistons of the shifting elements takes place through rotating elements, which are sealed by means of gap-type seals, such as a slide bearing and/or rectangular rings. Upon the actuation of the shifting element, in particular with high coupling pressures, such rotary joints known from the state of the art exhibit, in a disadvantageous manner, losses as a result of leaks.

By contrast, in manual and automated transmissions and in dual-clutch transmissions, the largely synchronized claw couplings are actuated through shift forks. Thereby, the synchronization gear teeth are provided with an undercut, in order to prevent an accidental disengagement when there is a load. In a load-free state, the respective sliding sleeve is axially locked by spring-loaded balls. In addition, the shift forks are fixed in their axial position through suitable devices.

However, the spring-loaded balls require a great amount of installation space, which is not always present in automatic transmissions.

U.S. Pat. No. 5,667,330 shows a claw coupling with a centric, single-sided piston that is able to be subject to pressure and a return spring. With the known claw coupling, a finger is provided for actuation; this takes hold through a slot hole in a shaft. With the known claw coupling, the actuation of the claw coupling is carried out inside the shaft.

From DE 10 2009 026 707 A1, an arrangement with at least one claw coupling for the shiftable coupling and decoupling of a shaft of an automatic transmission with a planetary design with at least one component is known, whereas the shaft is connectable to a component of a planetary gear set and whereas the claw coupling is arranged in a manner that is essentially centric inside a sun gear of the planetary gear set. Thereby, an arrangement that is neutral in respect of installation space is to be created.

Furthermore, DE 10 2009 026 710 A1 shows an arrangement with at least one claw coupling, which is connectable to at least one component of the transmission, whereas the claw coupling is arranged essentially inside a bearing carrier of the transmission, and features a stationary cylinder.

SUMMARY OF THE INVENTION

The present invention is subject to the task of specifying a claw shifting element comprising a sliding sleeve, in particular for an automatic transmission, which requires energy only for the gearshift and features required installation space that is as small as possible. Additional objects and advantages of the invention will be set forth in part in the following description, or may be obvious from the description, or may be learned through practice of the invention.

In accordance with the invention, this task is solved by the characteristics described and claimed herein.

Accordingly, a claw shifting element is proposed, with which the sliding sleeve is axially fixed in its two end positions—shifted or open—by frictional locking in a manner that saves installation space and costs, by means of a component, preferably by means of at least one component arranged to be stationary, which is preferably designed as an elastomer component. The axial force acting upon actuation on the sliding sleeve is higher than the static friction between the sliding sleeve and the component arranged to be stationary, between which and the sliding sleeve the frictional locking is created. If the sliding sleeve is actuated, it slides along the running surface of the component, between which and the sliding sleeve the friction for the axial fixing of the sliding sleeve in the end positions arises, e.g. the elastomer component.

The gear teeth of the claw shifting element in accordance with the invention are preferably designed without flank angles or without an undercut.

In accordance with the invention, the sliding sleeve of the claw shifting element is actuated through an actuating piston that is, for example, arranged in the housing (thus, not also rotating), which, for example, protrudes into a groove in the sliding sleeve with fingers or with a rotary projection. Thereby, an axial backlash is provided between the two components.

Thereby, the end position fixing of the sliding sleeve preferably takes place through the actuating piston with its own defined end positions. In accordance with the invention, in order to release the frictional contact between the actuating piston held in a non-pressurized state in its respective position primarily through its sealing elements through frictional locking and the sliding sleeve held in its respective position by the elastomer component likewise through frictional locking, means are provided at the two end positions of the actuating piston, which partially reset this after the withdrawal of the actuating pressure.

Within the framework of one arrangement of the invention, means for the partial resetting of the actuating piston are designed as spring elements, whereas, within the framework of an additional form, it is proposed that the spring elements at the two end positions of the piston are designed or arranged to be preloaded, in order to achieve a defined partial resetting. The spring elements may be designed as disk springs or wave springs.

Without preloading, the actuating piston is partially reset in a range of a residual preloading force greater than 0 to equal to 0. The preloading gives rise to the advantage that the axial backlash between the sliding sleeve and the actuating piston can be designed to be smaller.

In accordance with one additional form of the invention, achieving a partial resetting of the actuating piston not through spring elements, but through elastomer buffers, is proposed, whereas the elastomer buffers and the sealing element, which may be designed (for example) as a vulcanized lip sealing ring, preferably designed in one piece. This arrangement gives rise to the advantage that the necessary installation space can be further reduced with a reduction in manufacturing and assembly costs.

It is particularly advantageous if the actuating piston is pre-assembled or installed in a casing together with the sealing elements and means for the partial resetting of the actuating piston, whereas the pre-assembled casing is pressed into a housing, for example into a transmission housing (if necessary, up to a stop), and is axially fixed on the mounting side by an additional component or a retaining element.

In addition, the running surface of the elastomer component for fixing the control sleeve in the two positions may be designed as a crown, in order to thereby increase security against an unintended axial movement of the sliding sleeve.

The claw shifting element in accordance with the invention may be actuated with a shift fork instead of the actuating piston, which shift fork engages with fingers in a corresponding groove of the sliding sleeve, whereas a piston for the actuation of the shift fork is provided, which piston is arranged essentially axially parallel to the sliding sleeve in a casing. In accordance with one arrangement of the invention, in the two end positions of the piston, means for the partial resetting of the piston can be provided, which partially reset the piston after the withdrawal of the actuating pressure. The means for the partial resetting of the piston may be designed as spring elements, preferably as pressure springs or as elastomer buffers.

BRIEF DESCRIPTION OF THE DRAWINGS

In the following, the invention is more specifically illustrated as an example on the basis of the attached figures. The following are represented in these.

DETAILED DESCRIPTION

Figure 1:
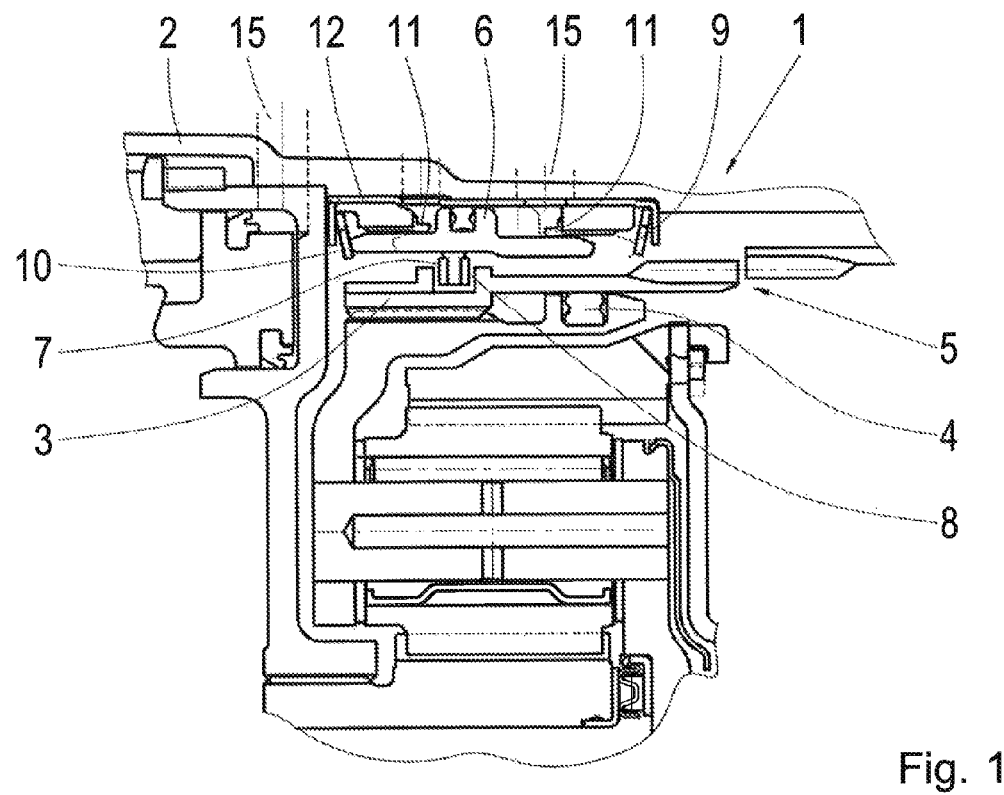
FIG. 1: a schematic view of a first embodiment in accordance with the invention of a claw shifting element, with which the sliding sleeve is actuated by an actuating piston.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows a schematic view of a first embodiment in accordance with the invention of a claw shifting element 1. The housing of the claw shifting element 1 is designated with the reference sign 2.

In accordance with the invention, the sliding sleeve 3 of the claw shifting element 1 is in its two end positions, which correspondingly fixes by frictional locking the claw shifting element 1 in a closed or open state, preferably by means of at least one elastomer component 4. In the example shown, the gear teeth 5 of the claw shifting element 1 are designed without flank angles or without an undercut.

With reference to FIG. 1, the sliding sleeve 3 of the claw shifting element 1 is actuated through an actuating piston 6 that is hydraulically or pneumatically actuated and is arranged in the housing 2 (thus, not also rotating), which, in the example shown, protrudes into a corresponding groove 8 in the sliding sleeve 3 with fingers 7. As an alternative to the fingers 7, the actuating piston 6 may feature a rotary projection, which protrudes into a corresponding groove 8 in the sliding sleeve 3. An axial backlash is provided between the fingers 7 or the projection of the actuating piston 6 and the groove 8 of the sliding sleeve 3.

In accordance with the invention, the end location fixing of the sliding sleeve 3 takes place through the actuating piston 6, which, viewed axially, features its own defined end positions, whereas spring elements 9, 10 are provided at the two end positions of the actuating piston 6, which spring elements partially reset the actuating piston 6 after the withdrawal of the actuating pressure.

The spring elements 9, 10 may be designed, for example, as disk springs. Through the spring elements 9, 10, the frictional contact between the actuating piston 6, held in a non-pressurized state in its respective position primarily through its sealing elements 11 through frictional locking, and the sliding sleeve 3, held in its respective position by the elastomer component 4 likewise through frictional locking, is released. The sealing elements 11 of the actuating piston 6 may be designed as vulcanized lip sealing rings. In the figures, pressure oil feed lines are designated with the reference signs 15.

Figure 2:
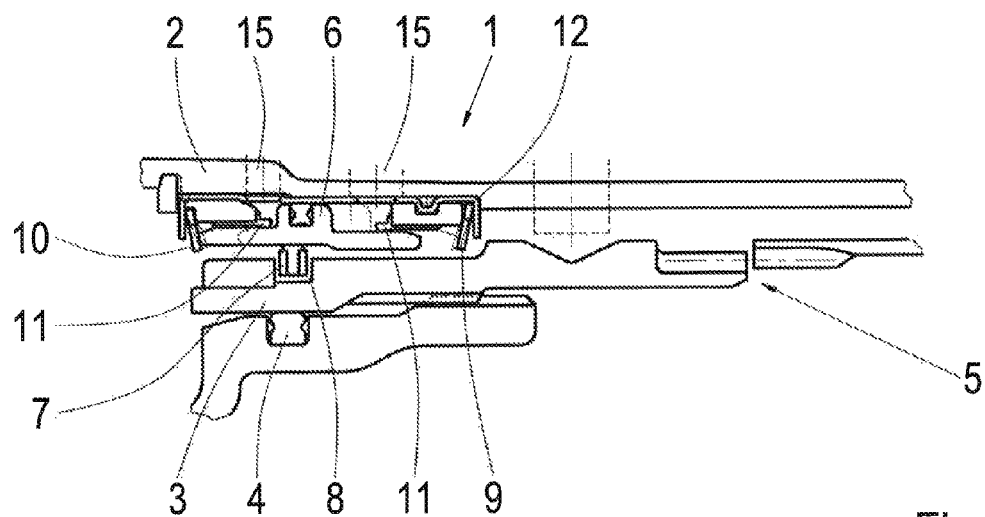
FIG. 2: a schematic view of a second embodiment in accordance with the invention of a claw shifting element, with which the sliding sleeve is actuated by an actuating piston.

Within the framework of an additional form of the invention and with reference to FIG. 2, the spring elements 9, 10 at the two end positions of the actuating piston 6 are designed or arranged to be preloaded, in order to achieve a defined partial resetting. In the example shown in FIG. 2, the spring elements 9, 10 designed as disk springs are arranged to be clamped and thus preloaded.

In the embodiments in accordance with FIGS. 1 and 2, the actuating piston 6 is pre-assembled or installed in a casing 12 together with the sealing elements 11 and the spring elements 9, 10, whereas the pre-assembled casing 12 is pressed into the housing 2 and is axially fixed on the mounting side by an additional component or a retaining element.

Figure 3:
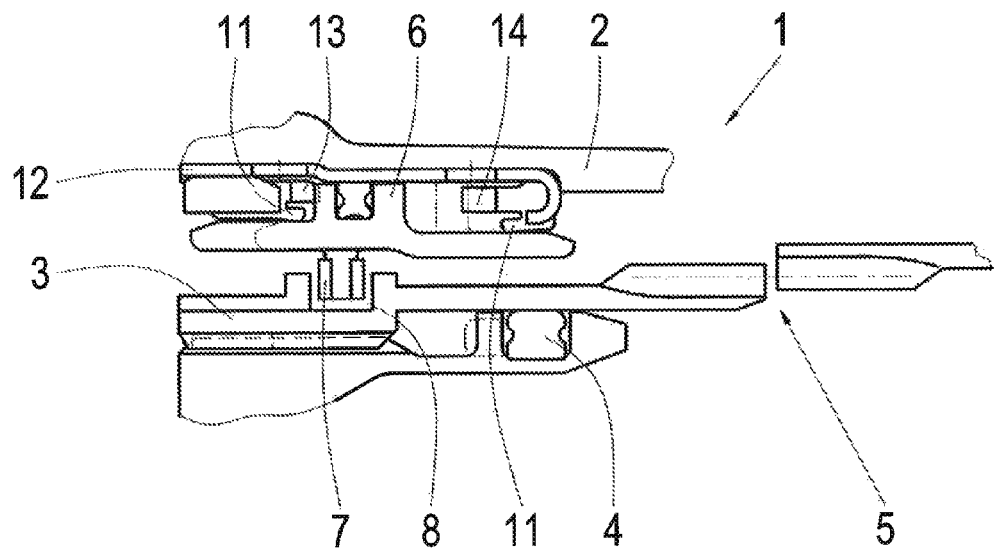
FIG. 3: a schematic view of a third embodiment in accordance with the invention of a claw shifting element, with which the sliding sleeve is actuated by an actuating piston.

In accordance with an additional form of the invention that is the subject matter of FIG. 3, a partial resetting of the actuating piston 6 is achieved not by spring elements, as shown in FIGS. 1 and 2, but through elastomer buffers 13, 14, whereas the elastomer buffers and the sealing element 11, which may be designed (for example) as a vulcanized lip sealing ring, preferably designed in one piece. With the example shown in FIG. 3, analogous to the embodiments under FIG. 1 or 2, the actuating piston 6 is pre-assembled or installed in a casing 12 together with the sealing elements 11 and the elastomer buffers 13, 14.

In addition, with the embodiment according to FIG. 3, the running surface of the elastomer component 4 for the axial fixing of the control sleeve 3 of the claw shifting element 1 in the two end positions may be designed as a crown, in order to thereby increase security against an unintended axial movement of the sliding sleeve 3.

Figure 4:
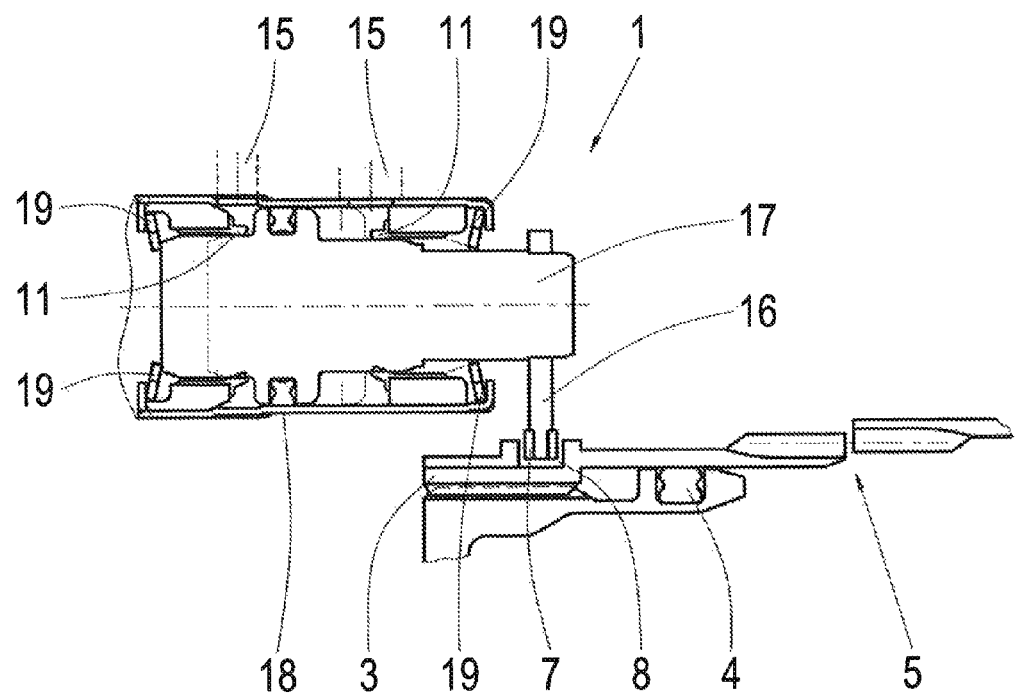
FIG. 4: a schematic view of a fourth embodiment in accordance with the invention of a claw shifting element, with which the sliding sleeve is actuated by a shift fork.

The subject matter of FIG. 4 is one embodiment of a claw shifting element 1 in accordance with the invention, with which, instead of an actuating piston, a shift fork 16 is provided for the actuation of the sliding sleeve 3. Moreover, for this embodiment, the sliding sleeve 3 of the claw shifting element 1 is in its two end positions, which correspondingly fixes by frictional locking the claw shifting element 1 in a closed or open state, preferably by means of at least one elastomer component 4.

The shift fork 16 engages with fingers 7 in a corresponding groove 8 of the sliding sleeve 3, whereas the piston 17 for the actuation of the shift fork is arranged essentially axially parallel to the sliding sleeve 3 in a casing 18. Thereby, in the two end positions of the piston 17, means for the partial resetting of the piston 17 are provided, which partially reset the piston 17 after the withdrawal of the actuating pressure, whereas the means for the partial resetting of the piston are designed as spring elements 19, preferably as pressure springs, as shown in FIG. 4, or as elastomer buffers. The spring elements 19, in particular the pressure springs, may be designed or arranged to be preloaded, by which a defined partial resetting of the piston 17 is achievable.

In the event that the spring elements are designed as elastomer buffers, these may be designed in one piece with the sealing elements 11 of the piston 17.

Modifications and variations can be made to the embodiments illustrated or described herein without departing from the scope and spirit of the invention as set forth in the appended claims.

The invention claimed is:

1. A claw shifting element for a motor vehicle transmission, comprising:
   a sliding sleeve that is axially movable between opposite end positions;
   the sliding sleeve axially fixable in each of the end positions by frictional locking of the sliding sleeve;
   a hydraulically actuated piston engaged with the sliding sleeve to move the sliding sleeve between the opposite end positions; and
   a stationary component that engages against the sliding sleeve and provides the friction locking of the sliding sleeve at each of the end positions in an unpressurized state of the piston, wherein an axial force acting upon the sliding sleeve upon actuation of the piston being greater than a static friction force between the sliding sleeve and the stationary component.

2. The claw shifting element as in claim 1, wherein the stationary component comprises an elastomer component.

3. The claw shifting element as in claim 2, wherein the elastomer component has a crown-shape.

4. The claw shifting element as in claim 1, further comprising an actuating fork that engages with fingers in a groove defined in the sliding sleeve, the actuating fork moved by a fork piston that is axially parallel to the sliding sleeve, the fork piston movable between end positions, and further comprising a reset device at each end position of the fork piston that partially resets the fork piston after withdrawal of actuating pressure from the fork piston.

5. The claw shifting element as in claim 4, wherein the reset devices comprise spring elements or elastomer buffers.

6. The claw shifting element as in claim 5, wherein the reset devices comprise pressure springs.

7. The claw shifting element as in claim 6, wherein the pressure springs are preloaded to achieve a defined partial resetting of the fork piston.

8. The claw shifting element as in claim 4, wherein the reset devices are elastomer buffers, the fork piston further comprising sealing elements that are formed as one piece with the elastomer buffers.

9. A claw shifting element for a motor vehicle transmission, comprising:
   a sliding sleeve that is axially movable between opposite end positions;
   the sliding sleeve axially fixable in each of the end positions by frictional locking of the sliding sleeve; and
   further comprising an actuating piston engaged with the sliding sleeve by way of a projection that engages within a groove in the sliding sleeve such that axial backlash is provided between the projection and the groove, the actuating piston arranged within a housing and being movable between end positions, and further comprising a reset device at each end position of the actuating piston that partially resets the actuating piston after withdrawal of actuating pressure from the actuating piston.

10. The claw shifting element as in claim 9, wherein the reset devices comprise spring elements or elastomer buffers.

11. The claw shifting element as in claim 9, wherein the reset devices comprise spring elements at the end positions of the actuating piston that are preloaded to achieve a defined partial resetting of the actuating piston.

12. The claw shifting element as in claim 11, wherein the spring elements are disk springs or wave springs.

13. The claw shifting element as in claim 9, wherein the reset devices are elastomer buffers, the actuating piston further comprising sealing elements that are formed as one piece with the elastomer buffers.

14. The claw shifting element as in claim 13, further comprising a housing in which the sliding sleeve is contained, wherein the actuating piston, the sealing elements, and the elastomer buffers are pre-assembled in a casing, the casing pressed into the housing.

* * * * *